US010960535B2

(12) United States Patent
Lundbäck

(10) Patent No.: US 10,960,535 B2
(45) Date of Patent: Mar. 30, 2021

(54) BASE FOR A PARALLEL KINEMATICS ROBOT

(71) Applicant: ABB Schweiz AG, Baden (CH)

(72) Inventor: Daniel Lundbäck, Västerås (SE)

(73) Assignee: ABB Schweiz AG, Baden (CH)

(*) Notice: Subject to any disclaimer, the term of this patent is extended or adjusted under 35 U.S.C. 154(b) by 151 days.

(21) Appl. No.: 16/315,884

(22) PCT Filed: Jul. 7, 2016

(86) PCT No.: PCT/EP2016/066160
§ 371 (c)(1),
(2) Date: Jan. 7, 2019

(87) PCT Pub. No.: WO2018/006968
PCT Pub. Date: Jan. 11, 2018

(65) Prior Publication Data
US 2019/0308313 A1 Oct. 10, 2019

(51) Int. Cl.
*B25J 9/00* (2006.01)
*B25J 9/10* (2006.01)
*F16H 57/02* (2012.01)
*B25J 19/00* (2006.01)

(52) U.S. Cl.
CPC .......... *B25J 9/0045* (2013.01); *B25J 9/003* (2013.01); *B25J 9/0009* (2013.01); *B25J 9/102* (2013.01); *F16H 57/02* (2013.01); *B25J 9/0051* (2013.01); *B25J 19/007* (2013.01)

(58) Field of Classification Search
CPC .......... B25J 9/0045; B25J 9/102; F16H 57/02
USPC .......................... 74/490.01–490.06
See application file for complete search history.

(56) References Cited

U.S. PATENT DOCUMENTS

| 4,636,138 A * | 1/1987 | Gorman | B25J 9/046 |
| | | | 414/735 |
| 4,671,732 A * | 6/1987 | Gorman | B25J 9/046 |
| | | | 414/735 |
| 6,119,542 A * | 9/2000 | Arbrink | B25J 9/102 |
| | | | 475/329 |
| 8,413,540 B2 * | 4/2013 | Long | B25J 9/102 |
| | | | 74/421 A |

(Continued)

FOREIGN PATENT DOCUMENTS

| CN | 101804631 A | 8/2010 |
| CN | 102069499 A | 5/2011 |

(Continued)

OTHER PUBLICATIONS

International Search Report and Written Opinion of the International Searching Authority Application No. PCT/EP2016/066160 completed: Mar. 29, 2017; dated: Apr. 6, 2017 12 pages.

(Continued)

*Primary Examiner* — Victor L MacArthur
(74) *Attorney, Agent, or Firm* — Whitmyer IP Group LLC

(57) ABSTRACT

A base for a parallel kinematics robot including a plurality of gear cavities. Each gear cavity having a first bearing seat configured to receive an output shaft bearing. The base consists of one piece in homogeneous material, and thereby interfaces negatively affecting the accuracy of the robot are omitted.

13 Claims, 2 Drawing Sheets

(56) References Cited

U.S. PATENT DOCUMENTS

| | | | | |
|---|---|---|---|---|
| 8,475,318 B2* | 7/2013 | Zhang | | F16H 1/46 |
| | | | | 475/230 |
| 8,733,196 B2* | 5/2014 | Goppelsroder | | F16H 57/025 |
| | | | | 74/421 A |
| 9,289,900 B2* | 3/2016 | Eliasson | | B25J 9/1692 |
| 2005/0211008 A1* | 9/2005 | Goppelsroder | | F16H 57/025 |
| | | | | 74/464 |
| 2006/0182602 A1* | 8/2006 | Schuler | | B23Q 1/5456 |
| | | | | 414/735 |
| 2007/0007055 A1* | 1/2007 | Schmidt | | F16H 1/20 |
| | | | | 180/65.235 |
| 2011/0033275 A1* | 2/2011 | Lehmann | | B25J 15/0616 |
| | | | | 414/737 |
| 2011/0113914 A1 | 5/2011 | Zhang et al. | | |
| 2011/0113917 A1* | 5/2011 | Long | | B25J 9/102 |
| | | | | 74/490.03 |
| 2011/0120254 A1* | 5/2011 | Zhang | | B25J 17/0266 |
| | | | | 74/490.04 |
| 2011/0277581 A1 | 11/2011 | Bunsendal et al. | | |
| 2014/0360306 A1* | 12/2014 | Mihara | | B25J 9/0051 |
| | | | | 74/490.02 |
| 2015/0101179 A1* | 4/2015 | Schmidt | | F16H 1/20 |
| | | | | 29/596 |
| 2018/0058567 A1* | 3/2018 | Engel | | B01F 15/00487 |

FOREIGN PATENT DOCUMENTS

| | | |
|---|---|---|
| CN | 102441889 A | 5/2012 |
| CN | 104227718 A | 12/2014 |
| DE | 202009001366 U1 | 4/2009 |
| WO | 2008074854 A1 | 6/2008 |
| WO | 2014029448 A1 | 2/2014 |

OTHER PUBLICATIONS

B Schäfer et al: "Light-Weight Mechatronics and Sensoric for Robotic Exploration: a DLR Perspective", Feb. 25, 2008 (Feb. 25, 2008) Retrieved from the Internet: URL:http://elib.dlr.de/55362/1/i-sairas2008_Schäfer.pdf [retrieved on Mar. 24, 2017] 8 pages.

Chinese Office Action, Search Report and Translation Application No. 2016800868609 dated Aug. 29, 2019 15 Pages.

International Preliminary Report on Patentability Application No. PCT/EP2016/066160 dated Jan. 8, 2019 7 pages.

* cited by examiner

BASE FOR A PARALLEL KINEMATICS ROBOT

TECHNICAL FIELD

The present invention relates to parallel kinematics robots with integrated transmissions.

BACKGROUND

It is conventionally known to provide a delta robot with a plurality of gear boxes that are discrete components and attached to a common fixture by means of bolts. The gear boxes are machined before the attachment to the fixture, and tolerances at interfaces between each gear box and the fixture add to errors in relative positions of machined surfaces between the plurality of gear boxes. Moreover, the bolt couplings at the interfaces contribute to a decreased stiffness of the robot. These errors and the decreased stiffness are furthermore reflected in the accuracy of the robot.

US20110277581A1 discloses a delta robot where a plurality of housings is integrated into a base made in one piece. The motor is configured to house drives that are discrete components, and bearing seats defining the positions of the respective axes are therefore not integrated in the housings but in the respective drives. Interfaces between the housings and the drives decrease the accuracy of the relative positions of the axes.

There remains a desire to enhance the accuracy of parallel kinematics robots.

SUMMARY

One object of the invention is to provide an improved parallel kinematics robot with an enhanced stiffness and overall accuracy.

This object is achieved by the device according to the invention.

The invention is based on the realization that when a plurality of gear cavities being part of a parallel kinematics robot is included in a base consisting of one piece, interfaces that negatively affect the accuracy of the robot are omitted.

According to a first aspect of the invention, there is provided a base for a parallel kinematics robot. The base comprises a plurality of gear cavities, each gear cavity comprising a first bearing seat configured to receive an output shaft bearing. The base consists of one piece in homogeneous material.

According to one embodiment of the invention, the base is manufactured by casting or moulding.

According to one embodiment of the invention, each gear cavity further comprises a first through hole configured to receive an output shaft.

According to one embodiment of the invention, each gear cavity further comprises a second bearing seat configured to receive an intermediate shaft bearing.

According to one embodiment of the invention, each gear cavity further comprises a second through hole configured to receive an intermediate shaft.

According to one embodiment of the invention, each gear cavity further comprises a third through hole configured to receive an input shaft.

According to one embodiment of the invention, the number of gear cavities is at least three.

According to a second aspect of the invention, there is provided a parallel kinematics robot comprising a base according to any of the preceding embodiments, and a plurality of covers, each gear cavity together with the respective cover defining a gear housing with an interior and an exterior.

According to one embodiment of the invention, the parallel kinematics robot further comprises a plurality of actuators, each actuator abutting upon the exterior of the respective gear housing and being configured to actuate at least one gear within the interior of the same.

BRIEF DESCRIPTION OF THE DRAWINGS

The invention will be explained in greater detail with reference to the accompanying drawings, wherein.

DETAILED DESCRIPTION

Figure 1:
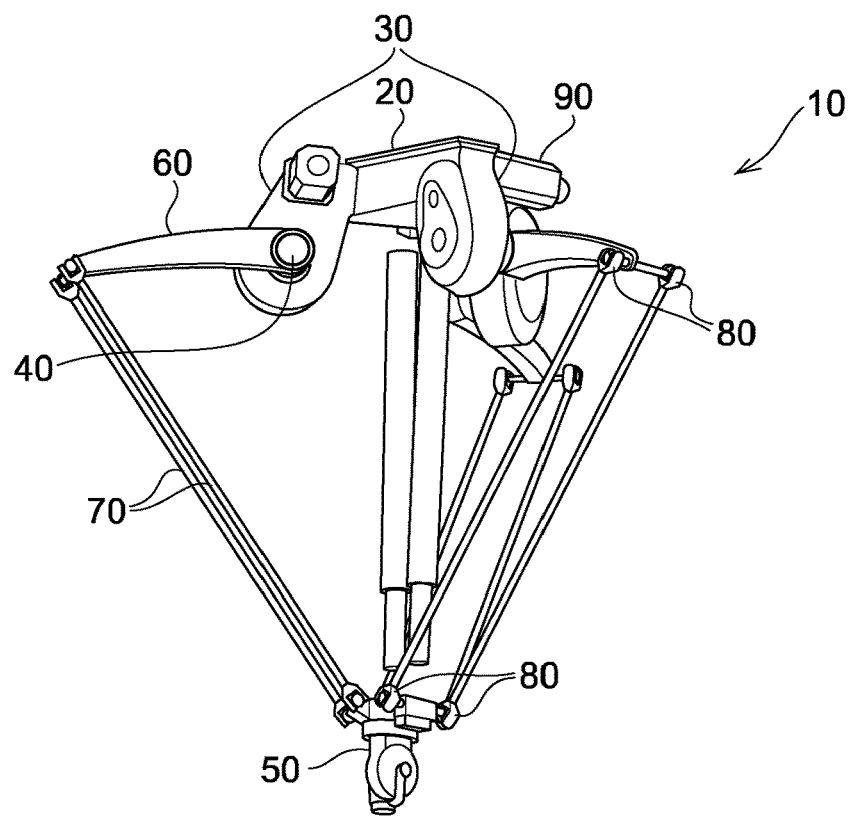
FIG. 1 shows a robot according to one embodiment of the invention.

Referring to FIG. 1, a parallel kinematics robot 10 according to one embodiment of the invention comprises a base 20 with three gear cavities 30. The base 20 is made of cast-iron by casting, and it thereby consists of one piece in homogeneous material, the three gear cavities 30 being integral parts of this one piece. The robot 10 further comprises three output shafts 40, each of them being attached to a respective gear cavity 30. Each output shaft 40 is connected to an end effector 50 by means of a respective kinematic chain comprising an upper arm 60, two lower arms 70 and four joints 80. The robot 10 further comprises a plurality of actuators in the form of electrical motors 90, each of them being configured to actuate the end effector 50 via the respective kinematic chain.

Figure 2:
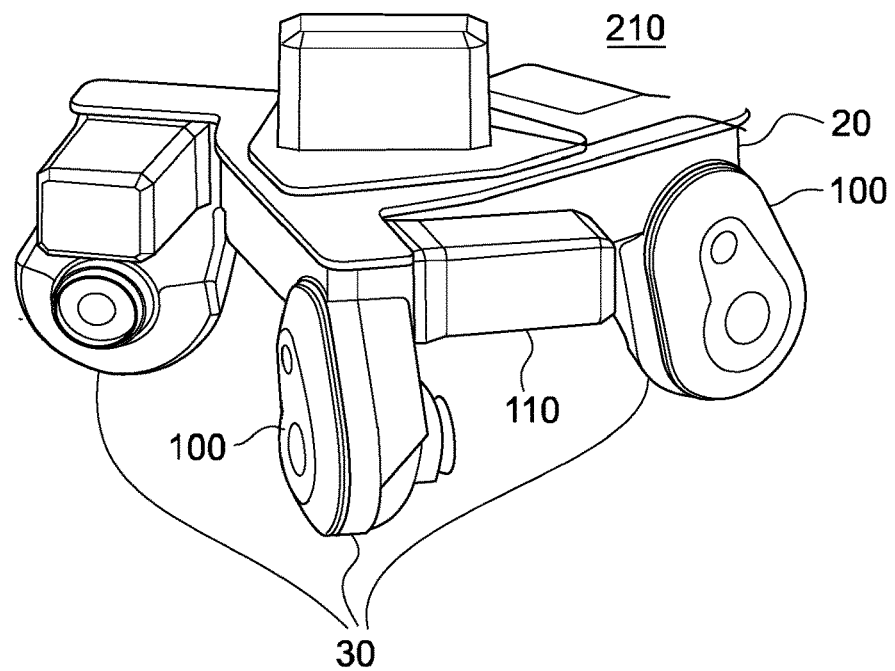
FIG. 2 shows a base according to one embodiment of the invention.

Referring to FIG. 2, each gear cavity 30 is provided with a cover 100, each gear cavity 30 together with the respective cover 100 defining a gear housing with an interior 220 (see FIG. 3) and an exterior 210. Each motor 90 is covered with a protective shell 110.

Figure 3:
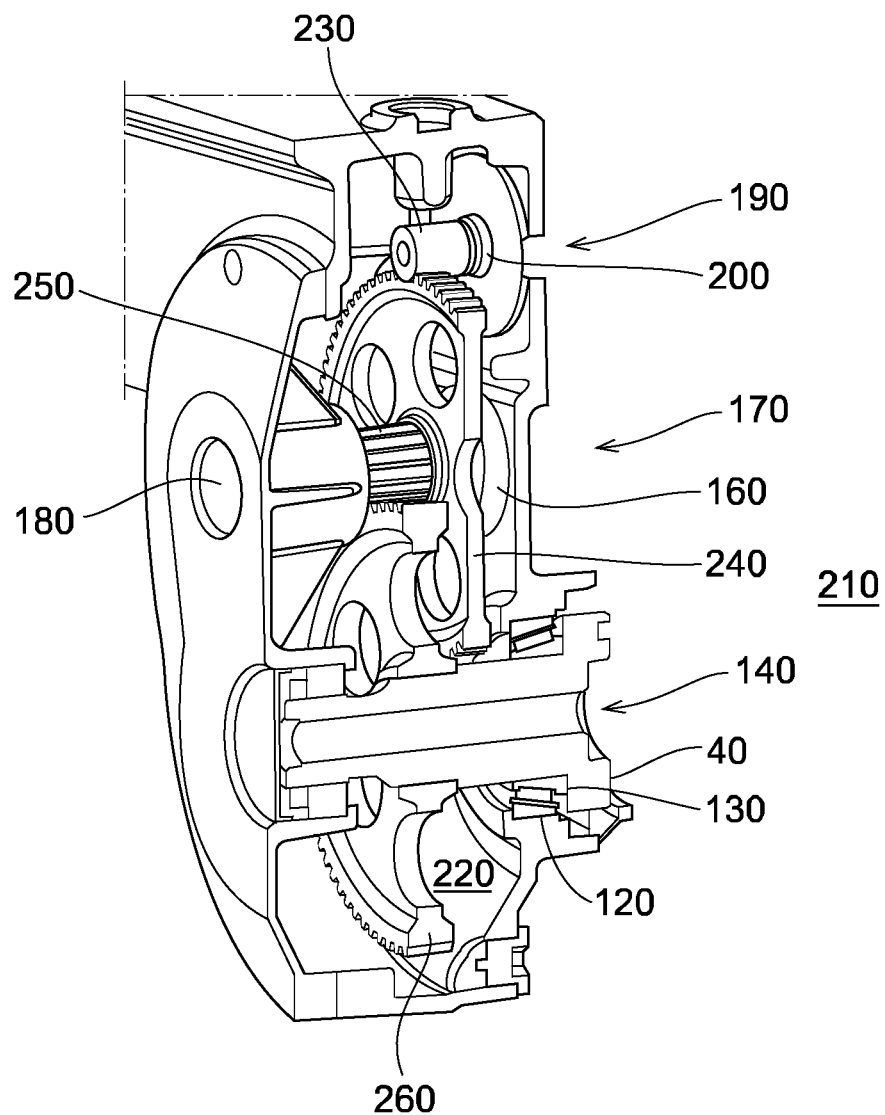
FIG. 3 shows a cross-section of a gear housing according to one embodiment of the invention.

Referring to FIG. 3, each gear cavity 30 comprises a machined first bearing seat 120 wherein an output shaft bearing 130 is received, and a first through hole 140 through which an output shaft 40 is received. Each gear cavity 30 further comprises a machined second bearing seat 160 wherein an intermediate shaft bearing (not shown) is received, and a second through hole 170 through which an intermediate shaft 180 is received. Each gear cavity 30 further comprises a third through hole 190 through which an input shaft 200 is received. Each input shaft 200 is a shaft of the respective motor 90 which is attached to the exterior 210 of the respective gear housing to abut upon the same. Each motor 90 actuates a plurality of gears within the interior 220 of the respective gear housing, and ultimately the end effector 50 via the respective output shaft 40 and the kinematic chain.

According to the embodiment shown in FIG. 3 a first pinion 230 fixedly attached to an input shaft 200 meshes with a first gear 240 fixedly attached to an intermediate shaft 180, and a second pinion 250 fixedly attached to the intermediate shaft 180 meshes with a second gear 260 fixedly attached to an output shaft 40. The fact that each gear cavity 30 comprises both the first and the third through holes 140, 190 implies that both the motors 90 and the upper arms 60 are located on the same side of each gear housing, namely on the side defined by each gear cavity 30. However, corresponding first and third through holes 140, 190 may also be comprised in the covers 100, which implies that the motors 90 and the upper arms 60 can be located on different sides of each gear housing, or on the same side defined by each cover 100.

The invention is not limited to the embodiments shown above, but the person skilled in the art may modify them in a plurality of ways within the scope of the invention as defined by the claims.

The invention claimed is:

1. A base for a parallel kinematics robot, the base comprising:
   a plurality of gear cavities, each gear cavity comprising a first bearing seat configured to receive an output shaft bearing and align said output shaft bearing along a first axis, each gear cavity further comprising a second bearing seat configured to receive an intermediate shaft bearing and align said intermediate shaft bearing along a second axis which is different from said first axis, wherein the base consists of one piece in homogeneous material.

2. The base according to claim 1, the base is manufactured by casting or moulding.

3. The base according to claim 1, wherein each gear cavity further comprises a first through hole configured to receive an output shaft.

4. The base according to claim 1, wherein each gear cavity further comprises a second through hole configured to receive an intermediate shaft.

5. The base according to claim 1, wherein each gear cavity further comprises a third through hole configured to receive an input shaft.

6. The base according to claim 1, wherein the number of gear cavities is at least three.

7. The base according to claim 2, wherein each gear cavity further comprises a first through hole configured to receive an output shaft.

8. The base according to claim 2, wherein each gear cavity further comprises a third through hole configured to receive an input shaft.

9. The base according to claim 2, wherein the number of gear cavities is at least three.

10. A parallel kinematics robot comprising:
    a base including a plurality of gear cavities, each gear cavity comprising a first bearing seat configured to receive an output shaft bearing and align said output shaft bearing along a first axis, each gear cavity further comprising a second bearing seat configured to receive an intermediate shaft bearing and align said intermediate shaft bearing along a second axis which is different from said first axis, wherein the base consists of one piece in homogeneous material; and
    a plurality of covers, each gear cavity together with the respective cover defining a gear housing with an interior and an exterior.

11. The parallel kinematics robot according to claim 10, further comprising a plurality of actuators, each actuator abutting upon the exterior of the respective gear housing and being configured to actuate at least one gear within the interior of the same.

12. The base according to claim 10, the base is manufactured by casting or moulding.

13. The base according to claim 10, wherein each gear cavity further comprises a first through hole configured to receive an output shaft.

* * * * *